(12) United States Patent
Kitamura et al.

(10) Patent No.: US 12,546,324 B2
(45) Date of Patent: Feb. 10, 2026

(54) ELECTRIC COMPRESSOR

(71) Applicant: MITSUBISHI HEAVY INDUSTRIES ENGINE & TURBOCHARGER, LTD., Sagamihara (JP)

(72) Inventors: Tsuyoshi Kitamura, Tokyo (JP); Byeongil An, Kanagawa (JP); Makoto Ogawa, Kanagawa (JP); Naomichi Shibata, Kanagawa (JP); Hokuto Isoda, Tokyo (JP); Yasutaka Aoki, Tokyo (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 0 days.

(21) Appl. No.: 18/836,521

(22) PCT Filed: Feb. 25, 2022

(86) PCT No.: PCT/JP2022/007974
§ 371 (c)(1),
(2) Date: Aug. 7, 2024

(87) PCT Pub. No.: WO2023/162160
PCT Pub. Date: Aug. 31, 2023

(65) Prior Publication Data
US 2025/0116277 A1    Apr. 10, 2025

(51) Int. Cl.
*F04D 17/12* (2006.01)
*F04D 25/06* (2006.01)
(Continued)

(52) U.S. Cl.
CPC ........... *F04D 17/122* (2013.01); *F04D 25/06* (2013.01); *F04D 27/003* (2013.01);
(Continued)

(58) Field of Classification Search
CPC ........ F04D 17/12; F04D 17/122; F04D 25/06; F04D 27/003; F04D 27/009;
(Continued)

(56) References Cited

U.S. PATENT DOCUMENTS 3,740,163 A * 6/1973 Schinnerer .............. F01D 25/22
415/121.2
4,523,896 A * 6/1985 Lhenry .................. F04D 29/058
417/244
(Continued)

FOREIGN PATENT DOCUMENTS

DE    10 2006 037 821 A1    2/2008
DE    10 2014 018 096 A1    7/2015
(Continued)

OTHER PUBLICATIONS

Written Opinion of the International Searching Authority for International Application No. PCT/JP2022/007974, dated May 10, 2022, with English translation.

*Primary Examiner* — Jesse S Bogue
(74) *Attorney, Agent, or Firm* — BIRCH, STEWART, KOLASCH & BIRCH, LLP (57) ABSTRACT

This electric compressor comprises: a housing that includes a stator having a cylindrical shape; a rotating shaft that is disposed inside the housing and that has a rotor facing the stator; a low pressure wheel that is fixed to one axial side of the rotating shaft; a high pressure wheel that is fixed to the other axial side of the rotating shaft; a low pressure side air bearing that rotatably supports, in the housing, a low pressure side shaft section of the rotating shaft; a high pressure side air bearing that rotatably supports, in the housing, a high pressure side shaft section of the rotating shaft; a first air flow path that supplies compressed air from the housing to either one of the low pressure side air bearing and the high pressure side air bearing; a second air flow path that
(Continued)

branches from the first air flow path and that supplies the compressed air to the other of the low pressure side air bearing and the high pressure side air bearing; and an air flow rate adjustment device that adjusts a flow rate of the compressed air flowing in the first air flow path and the second air flow path.

14 Claims, 8 Drawing Sheets

(51) Int. Cl.
*F04D 27/00* (2006.01)
*F04D 29/056* (2006.01)
*F04D 29/057* (2006.01)
*F04D 29/42* (2006.01)
*F04D 29/58* (2006.01)

(52) U.S. Cl.
CPC ......... *F04D 27/009* (2013.01); *F04D 29/056* (2013.01); *F04D 29/057* (2013.01); *F04D 29/4206* (2013.01); *F04D 29/584* (2013.01)

(58) Field of Classification Search
CPC .. F04D 29/0513; F04D 29/056; F04D 29/057; F04D 29/4206; F04D 29/58; F04D 29/584

See application file for complete search history.

(56) References Cited

U.S. PATENT DOCUMENTS

| | | | |
|---|---|---|---|
| 5,131,807 A * | 7/1992 | Fischer | F04D 29/70 415/121.2 |
| 9,732,766 B2 * | 8/2017 | Thompson | F04D 29/584 |
| 11,143,204 B2 * | 10/2021 | Park | F04D 25/024 |
| 2008/0038109 A1 * | 2/2008 | Sandstede | F01D 25/22 415/111 |
| 2015/0233384 A1 | 8/2015 | Thompson et al. | |
| 2015/0275920 A1 * | 10/2015 | Thompson | F04D 25/06 417/423.8 |
| 2023/0332607 A1 | 10/2023 | Shibata et al. | |

FOREIGN PATENT DOCUMENTS

| | | |
|---|---|---|
| JP | 2000-240596 A | 9/2000 |
| JP | 2008-45548 A | 2/2008 |
| JP | 2015-155696 A | 8/2015 |
| JP | 2015-187444 A | 10/2015 |
| JP | 6579649 B2 | 9/2019 |
| WO | WO 2022/013985 A1 | 1/2022 |

* cited by examiner

ELECTRIC COMPRESSOR

TECHNICAL FIELD

The present disclosure relates to a two-stage compression electric compressor.

BACKGROUND ART

For example, since a fuel cell requires high-pressure air, a two-stage compression electric compressor is applied to the fuel cell. The two-stage compression electric compressor is configured such that a rotating shaft is rotatably supported by a housing, a low-pressure stage wheel is provided on one axial side of the rotating shaft, and a high-pressure stage wheel is provided on the other axial side. The rotating shaft is rotatably supported on the housing by an air bearing. The air bearing includes a low-pressure stage side air bearing disposed on a low-pressure stage wheel side, and a high-pressure stage side air bearing disposed on a high-pressure stage wheel side. Some of compressed air compressed by the low-pressure stage wheel or the high-pressure stage wheel is bled and supplied to the low-pressure stage side air bearing and the high-pressure stage side air bearing. An example of the electric compressor including such an air bearing is described in PTL 1.

CITATION LIST

Patent Literature

[PTL 1] Japanese Patent No. 6579649

SUMMARY OF INVENTION

Technical Problem

In the electric compressor of the related art, some of low-pressure compressed air is supplied to the low-pressure stage side air bearing, and some of high-pressure compressed air is supplied to the high-pressure stage side air bearing. In this case, an annular flow path is provided in each of the low-pressure stage wheel side and the high-pressure stage wheel side of the housing along a circumferential direction. Some of the compressed air is stored in the annular flow paths, and the compressed air stored in the annular flow paths is supplied to the air bearing. In such a configuration, since each annular flow path is a space portion having a predetermined volume, the pressure loss increases when the compressed air is stored in the annular flow paths. In this case, the air bearing that supplies the compressed air does not function properly, which is a risk.

The present disclosure is devised to solve the above-described problems, and an object of the present disclosure is to provide an electric compressor that allows an air bearing to properly function by reducing the pressure loss of compressed air.

Solution to Problem

In order to achieve the above-described object, an electric compressor of the present disclosure includes a housing including a stator having a cylindrical shape; a rotating shaft disposed inside the housing and including a rotor facing the stator; a low-pressure stage wheel fixed to one axial side of the rotating shaft; a high-pressure stage wheel fixed to the other axial side of the rotating shaft; a low-pressure stage side air bearing that rotatably supports a low-pressure stage side shaft portion of the rotating shaft on the housing; a high-pressure stage side air bearing that rotatably supports a high-pressure stage side shaft portion of the rotating shaft on the housing; a first air flow path that supplies compressed air from the housing to one of the low-pressure stage side air bearing and the high-pressure stage side air bearing; a second air flow path that branches from the first air flow path, and that supplies the compressed air to the other of the low-pressure stage side air bearing and the high-pressure stage side air bearing; and an air flow rate adjusting device that adjusts a flow rate of the compressed air flowing through the first air flow path and the second air flow path.

Advantageous Effects of Invention

According to the electric compressor of the present disclosure, the air bearing is allowed to properly function by reducing the pressure loss of the compressed air.

DESCRIPTION OF EMBODIMENTS

A preferred embodiment of the present disclosure will be described in detail below with reference to the drawings. The present disclosure is not limited by the embodiment, and when there are a plurality of embodiments, the present disclosure also includes those configured by combining the embodiments. In addition, components in the embodiments include those that can be easily contemplated by those skilled in the art, those that are substantially the same, and those within a so-called equivalent range.

First Embodiment

<Configuration of Electric Compressor>

Figure 1:
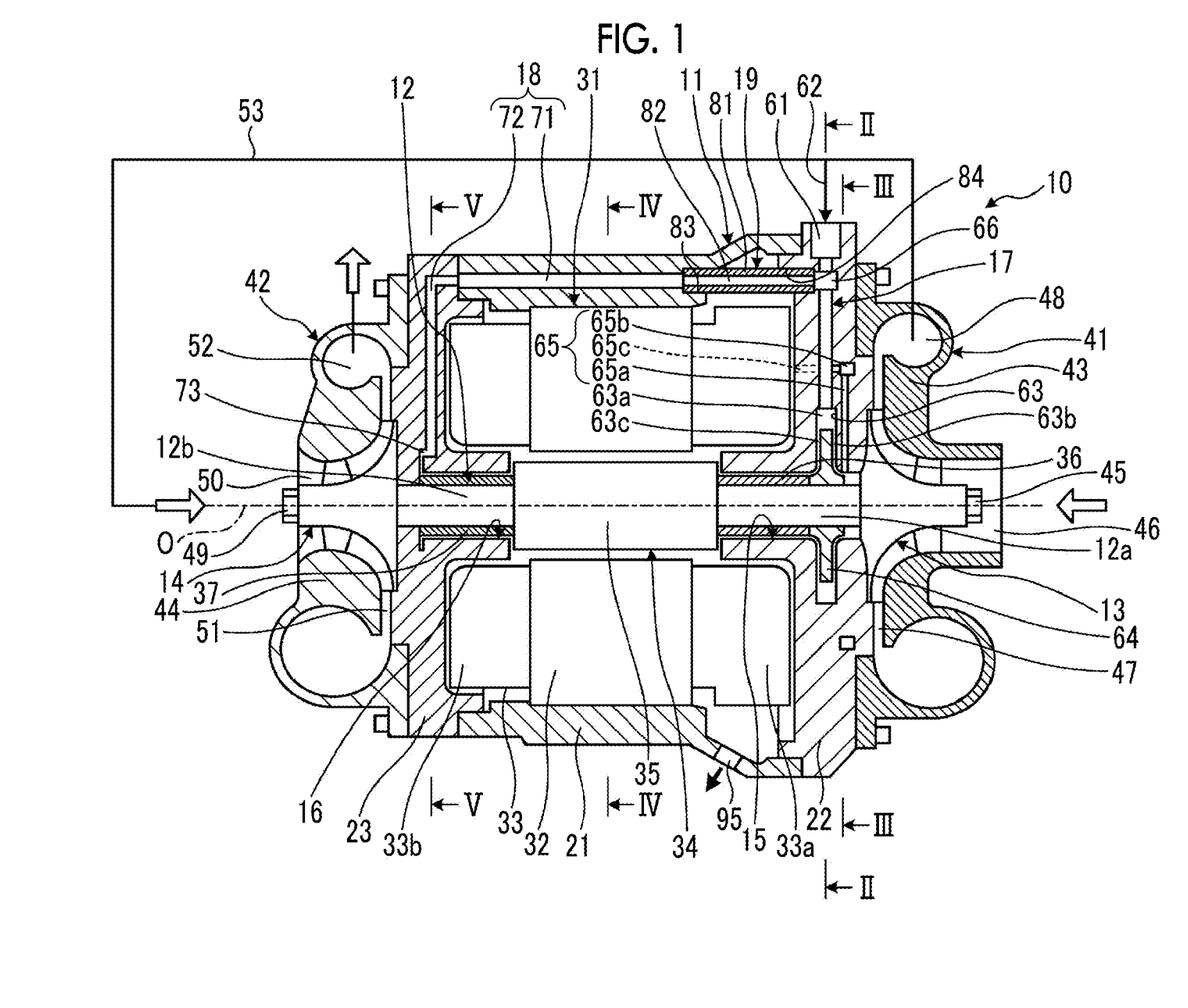
FIG. 1 is a longitudinal sectional view showing an internal configuration of an electric compressor according to a first embodiment.

FIG. 1 is a longitudinal sectional view showing an internal configuration of an electric compressor according to a first embodiment.

As shown in FIG. 1, an electric compressor 10 includes a housing 11, a rotating shaft 12, a low-pressure stage wheel 13, a high-pressure stage wheel 14, a low-pressure stage side air bearing 15, a high-pressure stage side air bearing 16, a first air flow path 17, a second air flow path 18, and an air flow rate adjusting device 19.

The housing 11 includes a motor housing 21, a low-pressure stage side bearing housing 22, and a high-pressure stage side bearing housing 23. The motor housing 21 has a cylindrical shape, and is increased in diameter at an end portion on one axial side (right side in FIG. 1). The low-pressure stage side bearing housing 22 has a disk shape, and is disposed on the one axial side of the motor housing 21. The low-pressure stage side bearing housing 22 is detachably fastened to the end portion on the one axial side of the motor housing 21 by a plurality of bolts. The high-pressure stage side bearing housing 23 has a disk shape, and is disposed on the other axial side of the motor housing 21. The high-pressure stage side bearing housing 23 is detachably fastened to an end portion on the other axial side of the motor housing 21 by a plurality of bolts.

In the motor housing 21 having a cylindrical shape, one opening in an axial direction is closed by the low-pressure stage side bearing housing 22, and the other opening in the axial direction is closed by the high-pressure stage side bearing housing 23. For this reason, the housing 11 is formed into a hollow shape by fastening the low-pressure stage side bearing housing 22 and the high-pressure stage side bearing housing 23 to the motor housing 21.

A stator 31 is fixed to an inner peripheral portion of the motor housing 21. The stator 31 has a cylindrical shape. The stator 31 includes a stator iron core 32 and a stator coil 33. The stator iron core 32 has a cylindrical shape, and is fixed such that an outer peripheral surface thereof comes into close contact with an inner peripheral surface of the motor housing 21. The stator coil 33 is wound around the stator iron core 32, a part of the stator coil 33 is stored inside the stator iron core 32, and a low-pressure stage side coil end 33a and a high-pressure stage side coil end 33b are exposed on one side and the other side of the stator iron core 32 in the axial direction.

The rotating shaft 12 is disposed inside the housing 11. The rotating shaft 12 is disposed along an axis O concentric with the housing 11, and is supported by the housing 11 so as to be rotatable around the axis O. A rotor 34 is fixed to an outer peripheral portion of the rotating shaft 12 at an intermediate position in the axial direction. The rotor 34 includes a rotor iron core (permanent magnet) 35. The rotor iron core 35 has a cylindrical shape, and is fixed to an outer peripheral surface of the rotating shaft 12.

An inner peripheral surface of the stator 31 and an outer peripheral surface of the rotor 34 face each other in a radial direction. A gap is provided between the inner peripheral surface of the stator 31 and the outer peripheral surface of the rotor 34. For this reason, when a current flows through the stator coil 33 of the stator 31, the rotor 34 rotates due to an attractive force and a repulsive force of a magnetic force to be generated, and the rotating shaft 12 outputs a rotational force.

The rotating shaft 12 is rotatably supported on the housing 11 by the low-pressure stage side air bearing 15 and the high-pressure stage side air bearing 16. The rotating shaft 12 includes a low-pressure stage side shaft portion 12a provided on the one axial side with respect to the rotor 34, and a high-pressure stage side shaft portion 12b provided on the other axial side with respect to the rotor 34. The rotating shaft 12 is configured such that a low-pressure stage side bearing sleeve 36 is integrally rotatably mounted on the low-pressure stage side shaft portion 12a, and a high-pressure stage side bearing sleeve 37 is integrally rotatably mounted on the high-pressure stage side shaft portion 12b. The low-pressure stage side bearing sleeve 36 functions as a low-pressure stage side shaft portion, and the high-pressure stage side bearing sleeve 37 functions as a high-pressure stage side shaft portion. The low-pressure stage side bearing sleeve 36 and the high-pressure stage side bearing sleeve 37 may be eliminated, and the rotating shaft 12 may be directly supported by the low-pressure stage side air bearing 15 and the high-pressure stage side air bearing 16.

The low-pressure stage side air bearing 15 is provided integrally with the low-pressure stage side bearing housing 22. The low-pressure stage side air bearing 15 has a cylindrical shape, and is formed to extend from an inner surface of the low-pressure stage side bearing housing 22 to a rotor 34 side. The low-pressure stage side air bearing 15 is disposed outside the low-pressure stage side bearing sleeve 36 mounted on the rotating shaft 12. A low-pressure stage side gap is ensured between an inner peripheral surface of the low-pressure stage side air bearing 15 and an outer peripheral surface of the low-pressure stage side bearing sleeve 36.

The high-pressure stage side air bearing 16 is provided integrally with the high-pressure stage side bearing housing 23. The high-pressure stage side air bearing 16 has a cylindrical shape, and is formed to extend from an inner surface of the high-pressure stage side bearing housing 23 to the rotor 34 side. The high-pressure stage side air bearing 16 is disposed outside the high-pressure stage side bearing sleeve 37 mounted on the rotating shaft 12. A high-pressure stage side gap is ensured between an inner peripheral surface of the high-pressure stage side air bearing 16 and an outer peripheral surface of the high-pressure stage side bearing sleeve 37.

In the housing 11, a low-pressure stage compressor 41 is disposed on a low-pressure stage side bearing housing 22 side, and a high-pressure stage compressor 42 is disposed on a high-pressure stage side bearing housing 23 side. The low-pressure stage compressor 41 includes a low-pressure stage side housing 43 and the low-pressure stage wheel 13. The high-pressure stage compressor 42 includes a high-pressure stage side housing 44 and the high-pressure stage wheel 14.

The low-pressure stage side housing 43 is fastened to an outer surface of the low-pressure stage side bearing housing 22 by a plurality of bolts. The low-pressure stage wheel 13 is disposed inside the low-pressure stage side housing 43. The low-pressure stage wheel 13 is integrally rotatably fixed to one end portion of the rotating shaft 12 in the axial direction by bolts 45. A suction port 46, a diffuser 47, a scroll portion 48 having a spiral shape, and a discharge port (not shown) are provided in the low-pressure stage compressor 41 by the low-pressure stage side housing 43 and the low-pressure stage wheel 13.

The high-pressure stage side housing 44 is fastened to an outer surface of the high-pressure stage side bearing housing 23 by a plurality of bolts. The high-pressure stage wheel 14 is disposed inside the high-pressure stage side housing 44. The high-pressure stage wheel 14 is integrally rotatably fixed to the other end portion of the rotating shaft 12 in the axial direction by bolts 49. A suction port 50, a diffuser 51, a scroll portion 52 having a spiral shape, and a discharge port (not shown) are provided in the high-pressure stage compressor 42 by the high-pressure stage side housing 44 and the high-pressure stage wheel 14.

In addition, the discharge port (not shown) of the low-pressure stage compressor 41 and the suction port 50 of the high-pressure stage compressor 42 are connected by a connection flow path 53.

In the low-pressure stage compressor 41, when the low-pressure stage wheel 13 rotates, the outside air is suctioned from the suction port 46 and is accelerated by a centrifugal force of the low-pressure stage wheel 13, and the accelerated air is decelerated and pressurized by the diffuser 47, and then flows through the scroll portion 48 and is discharged from the discharge port. The low-pressure air compressed by the low-pressure stage compressor 41 is fed to the high-pressure stage compressor 42 by the connection flow path 53. In the high-pressure stage compressor 42, when the high-pressure stage wheel 14 rotates, the outside air is suctioned from the suction port 50 and is accelerated by a centrifugal force of the high-pressure stage wheel 14, and the accelerated air is decelerated and pressurized by the diffuser 51, and then flows through the scroll portion 52 and is discharged from the discharge port.

<First Air Flow Path>

Figure 2:
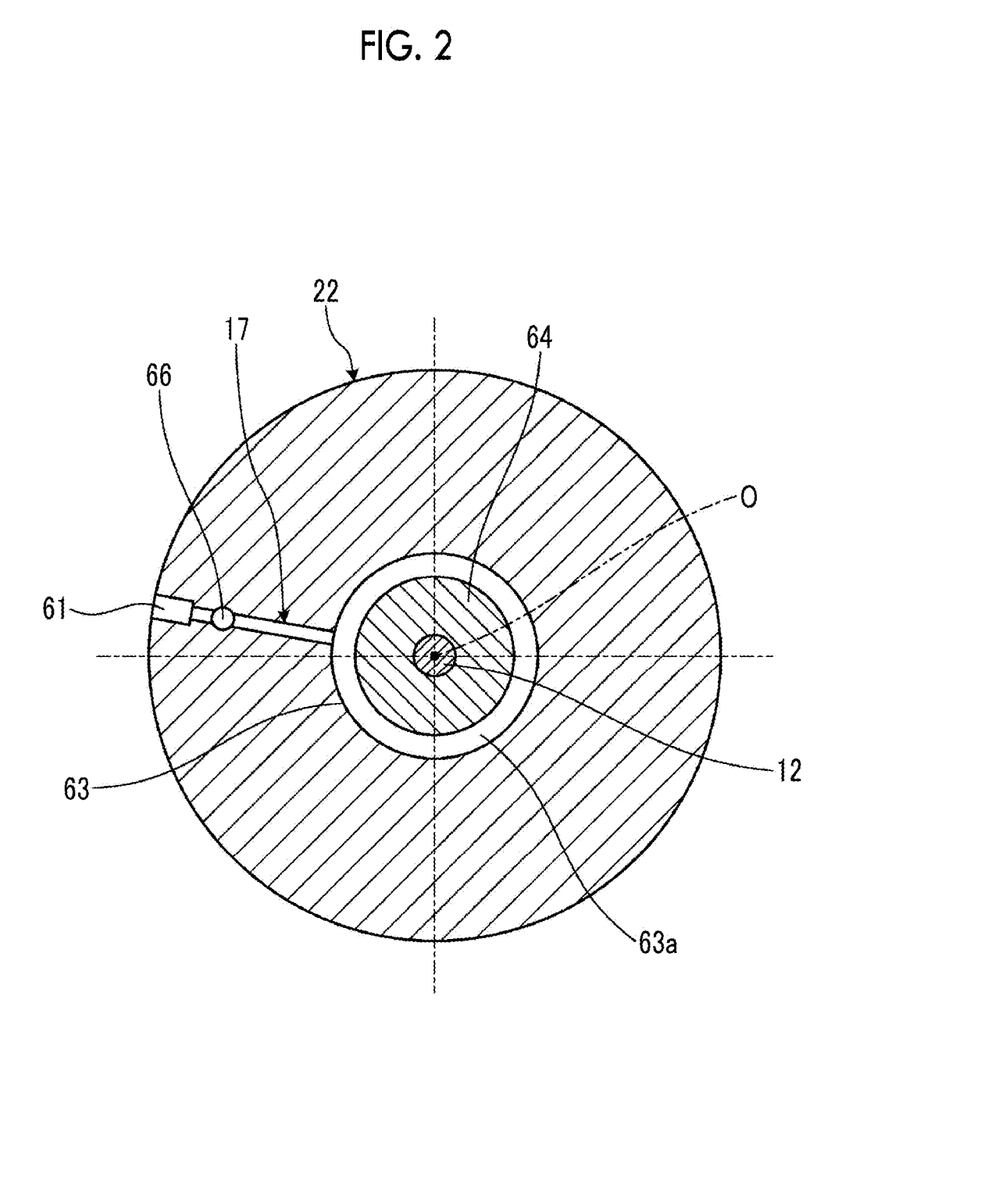
FIG. 2 is a cross-sectional view taken along line II-II of FIG. 1, which shows a first air passage.
Figure 3:
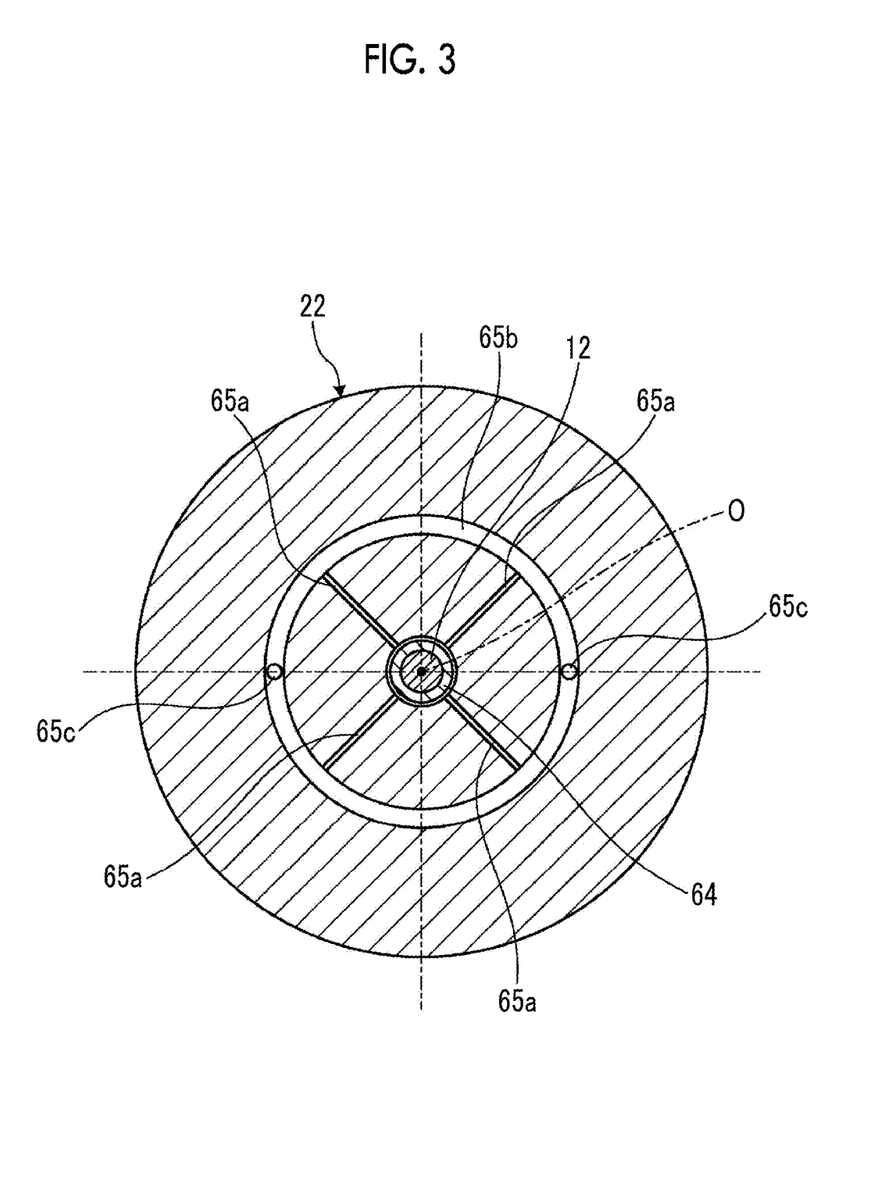
FIG. 3 is a cross-sectional view taken along line III-III of FIG. 1, which shows a first bypass passage.

FIG. 2 is a cross-sectional view taken along line II-II of FIG. 1, which shows the first air passage, and FIG. 3 is a cross-sectional view taken along line III-III of FIG. 1, which shows a first bypass passage.

As shown in FIGS. 1 and 2, the first air flow path 17 supplies compressed air from the housing 11 to the low-pressure stage side air bearing 15. Only one first air flow path 17 is provided in the housing 11; however, a plurality of the first air flow paths 17 may be provided. The first air flow path 17 is provided along the radial direction of the rotating shaft 12 in the housing 11.

Namely, one (or a plurality of) first air flow path 17 is provided along the radial direction in the low-pressure stage side bearing housing 22. An air intake port 61 is provided at one end on a radially outer side of the first air flow path 17. An air bleeding flow path 62 branched from the connection flow path 53 is connected to the air intake port 61. Some of the low-pressure air (compressed air) discharged from the low-pressure stage compressor 41 is bled by the air bleeding flow path 62, and is supplied to the air intake port 61 of the first air flow path 17. An air bleeding flow path that bleeds high-pressure air (compressed air) discharged from the high-pressure stage compressor 42 may be connected to the air intake port 61. A low-pressure stage side space portion 63 is provided on an outer periphery of the axis O in the low-pressure stage side bearing housing 22. The other end on a radially inner side of the first air flow path 17 communicates with the low-pressure stage side space portion 63.

A thrust disk 64 constituting a thrust bearing is fixed to the rotating shaft 12. The thrust disk 64 is fixed to the rotating shaft 12 between the low-pressure stage side bearing sleeve 36 and the low-pressure stage wheel 13. The thrust disk 64 rotates integrally with the rotating shaft 12. The thrust disk 64 is disposed in the low-pressure stage side space portion 63. A low-pressure stage side annular flow path 63a, one surface-side annular passage 63b, and the other surface-side annular passage 63c are formed in the low-pressure stage side bearing housing 22 by disposing the thrust disk 64 in the low-pressure stage side space portion 63. The low-pressure stage side annular flow path 63a, the one surface-side annular passage 63b, and the other surface-side annular passage 63c are continuous in a circumferential direction. The low-pressure stage side annular flow path 63a is provided on an outer peripheral side of the thrust disk 64 in the low-pressure stage side space portion 63. The one surface-side annular passage 63b is provided on one surface side (low-pressure stage wheel 13 side) of the thrust disk 64 in the low-pressure stage side space portion 63. The other surface-side annular passage 63c is provided on the other surface side (low-pressure stage side bearing sleeve 36 side) of the thrust disk 64 in the low-pressure stage side space portion 63. The other surface-side annular passage 63c communicates with a low-pressure stage gap between the inner peripheral surface of the low-pressure stage side air bearing 15 and the outer peripheral surface of the low-pressure stage side bearing sleeve 36. Wear-resistant coating layers are applied to surfaces of the low-pressure stage side bearing housing 22 which face the one surface-side annular passage 63b and the other surface-side annular passage 63c, and cooling is required to protect the wear-resistant coating layers.

For this reason, the low-pressure air (hereinafter, compressed air) bled from the connection flow path 53 is sent from the air bleeding flow path 62 to the air intake port 61, flows through the first air flow path 17 to the radially inner side, and is supplied to the low-pressure stage side annular flow path 63a (low-pressure stage side space portion 63). At this time, compressed air in the low-pressure stage side annular flow path 63a is supplied to the one surface-side annular passage 63b and the other surface-side annular passage 63c. The high-pressure air acts on the one surface side and the other surface side of the thrust disk 64, so that the rotating shaft 12 that is integral with the thrust disk 64 is supported at a predetermined position in the axial direction. In addition, the wear-resistant coating layers applied to the surfaces of the low-pressure stage side bearing housing 22 which face the one surface-side annular passage 63b and the other surface-side annular passage 63c are cooled by the compressed air.

The compressed air in the low-pressure stage side annular flow path 63a is supplied to the low-pressure stage side air bearing 15 through the other surface-side annular passage 63c. Namely, the compressed air is supplied to the low-pressure stage gap between the inner peripheral surface of the low-pressure stage side air bearing 15 and the outer peripheral surface of the low-pressure stage side bearing sleeve 36, so that the rotating shaft 12 is supported at a predetermined position in the radial direction. Thereafter, the compressed air supplied to the low-pressure stage side air bearing 15 flows into a gap between the stator 31 and the rotor 34, and cools the stator iron core 32 and the stator coil 33 of the stator 31. The compressed air that has cooled the stator 31 is discharged to the outside from an air discharge port 95 provided in the housing 11.

In addition, as shown in FIGS. 1 and 3, the low-pressure stage side bearing housing 22 is provided with a first bypass flow path 65. The first bypass flow path 65 is open toward the stator coil 33 of the stator 31 through the one surface-side annular passage 63b. The first bypass flow path 65 includes a radial flow path 65a, an annular flow path 65b, and an axial flow path 65c. One end of the radial flow path 65a communicates with the one surface-side annular passage 63b, and the other end thereof communicates with the annular flow path 65b. A plurality of the radial flow paths 65a are provided at intervals in the circumferential direction of the low-pressure stage side bearing housing 22. One end of the axial flow path 65c communicates with the annular flow path 65b, and the other end thereof is open to the inner surface of the low-pressure stage side bearing housing 22. A plurality of the axial flow paths 65c are provided at intervals in the circumferential direction of the low-pressure stage side bearing housing 22.

For this reason, the compressed air in the one surface-side annular passage 63b flows through the radial flow paths 65a, the annular flow path 65b, and the axial flow paths 65c of the first bypass flow path 65, and is discharged to an inner surface side of the low-pressure stage side bearing housing 22, so that the stator coil 33 facing the inner surface of the low-pressure stage side bearing housing 22 is cooled.

<Second Air Flow Path>

Figure 4:
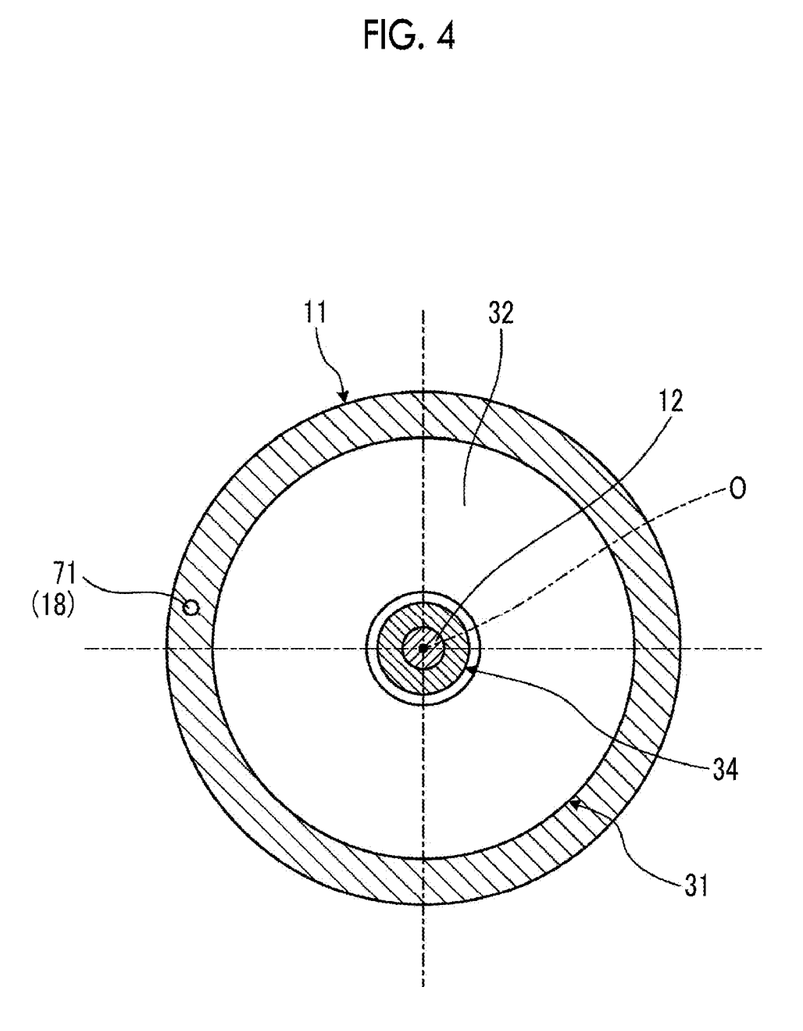
FIG. 4 is a cross-sectional view taken along line IV-IV of FIG. 1, which shows a second air passage.
Figure 5:
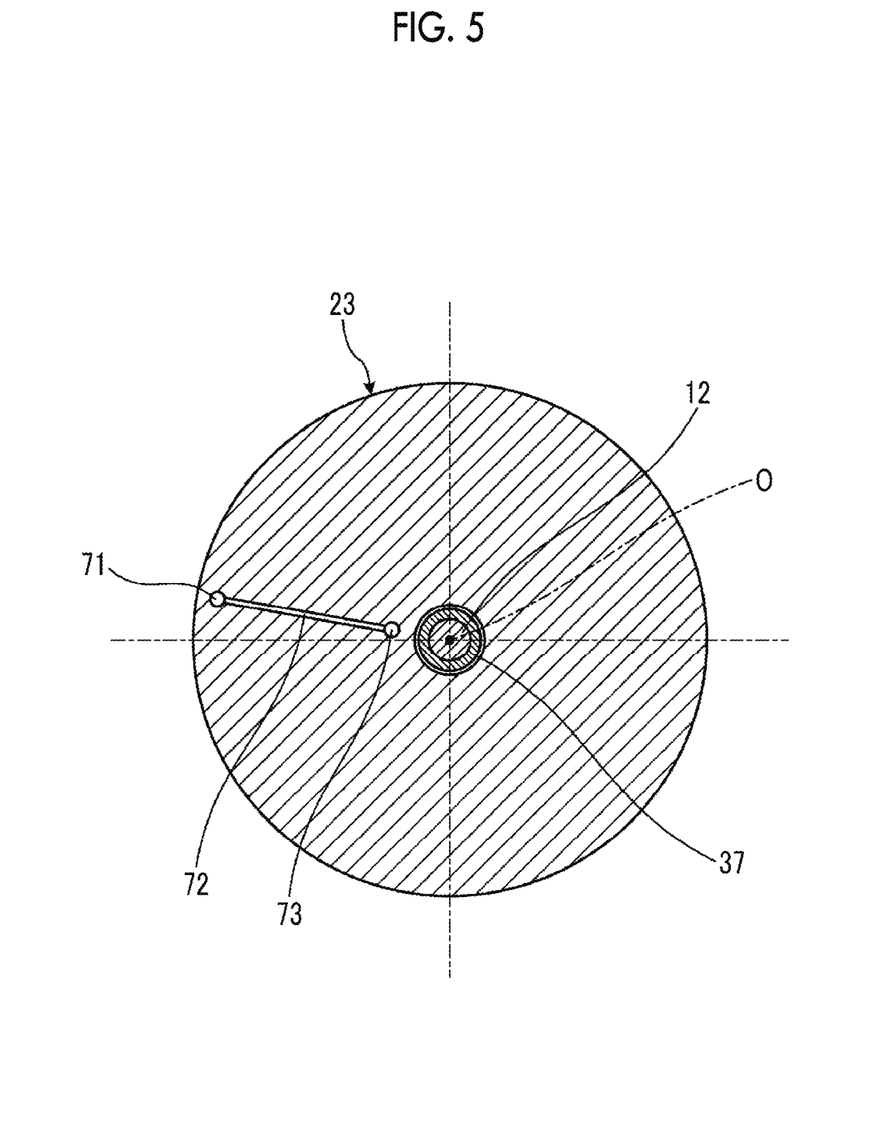
FIG. 5 is a cross-sectional view taken along line V-V of FIG. 1, which shows the second air passage.

FIG. 4 is a cross-sectional view taken along line IV-IV of FIG. 1, which shows the second air passage, and FIG. 5 is a cross-sectional view taken along line V-V of FIG. 1, which shows the second air passage.

As shown in FIGS. 1, 4, and 5, the second air flow path 18 is provided to branch from the first air flow path 17, and supplies the compressed air to the high-pressure stage side air bearing 16. Only one second air flow path 18 is provided in the housing 11; however, a plurality of the second air flow paths 18 may be provided. The second air flow path 18 includes an axial air flow path 71 and a radial air flow path 72. The axial air flow path 71 is branched from the first air flow path 17, and is provided along the axial direction of the rotating shaft 12 in the housing 11. The radial air flow path 72 communicates with the axial air flow path 71, and is provided along the radial direction of the rotating shaft 12 in the housing 11.

Namely, one axial air flow path 71 is provided along the axial direction in the motor housing 21. One end of the axial air flow path 71 communicates with a branching portion 66 provided in the first air flow path 17. One (or a plurality of) radial air flow path 72 is provided along the radial direction in the high-pressure stage side bearing housing 23. One end on the radially outer side of the radial air flow path 72 communicates with the other end of the axial air flow path 71. A high-pressure stage side annular flow path 73 is provided on the outer periphery of the axis O in the high-pressure stage side bearing housing 23. The high-pressure stage side annular flow path 73 is provided outside an end portion on a high-pressure stage wheel 14 side of the high-pressure stage side bearing sleeve 37. The other end on the radially inner side of the radial air flow path 72 communicates with the high-pressure stage side annular flow path 73. The high-pressure stage side annular flow path 73 communicates with the high-pressure stage gap between the inner peripheral surface of the high-pressure stage side air bearing 16 and the outer peripheral surface of the high-pressure stage side bearing sleeve 37.

For this reason, the compressed air branched from the first air flow path 17 flows through the axial air flow path 71 of the second air flow path 18 in the axial direction, and then flows through the radial air flow path 72 in the radial direction, and is supplied to the high-pressure stage side annular flow path 73. Compressed air in the high-pressure stage side annular flow path 73 is supplied to the high-pressure stage side air bearing 16. Namely, the compressed air is supplied to the high-pressure stage gap between the inner peripheral surface of the high-pressure stage side air bearing 16 and the outer peripheral surface of the high-pressure stage side bearing sleeve 37, so that the rotating shaft 12 is supported at a predetermined position in the radial direction. Thereafter, the compressed air supplied to the high-pressure stage side air bearing 16 flows into the gap between the stator 31 and the rotor 34, and cools the stator iron core 32 and the stator coil 33 of the stator 31. The compressed air that has cooled the stator 31 is discharged to the outside from an air discharge port 95 provided in the housing 11.

<Air Flow Rate Adjusting Device>

As shown in FIG. 1, the air flow rate adjusting device 19 adjusts a flow rate of the compressed air flowing through the first air flow path 17 and the second air flow path 18. The air flow rate adjusting device 19 is provided in the second air flow path 18.

The air flow rate adjusting device 19 includes a plurality of air flow rate adjusting members 81 having different flow path areas. The air flow rate adjusting members 81 are detachably provided in the housing 11. The air flow rate adjusting members 81 are, for example, pipes in each of which a straight flow path 82 having a circular cross section is formed. A plurality of types of the air flow rate adjusting members 81 in each of which a flow path area of the straight flow path 82 is less than or equal to a flow path area of the axial air flow path 71 of the second air flow path 18 are prepared. However, the air flow rate adjusting members 81 may be flow paths including throttle portions having different flow path areas.

A first accommodation recessed portion 83 communicating with one end portion of the axial air flow path 71 is provided on one end portion side of the motor housing 21 in the axial direction. In addition, a second accommodation recessed portion 84 communicating with the branching portion 66 of the first air flow path 17 is provided on the inner surface side of the low-pressure stage side bearing housing 22. The air flow rate adjusting members 81 are accommodated in the first air flow path 17 and the second accommodation recessed portion 84 when the low-pressure stage side bearing housing 22 is assembled to the motor housing 21.

The air flow rate adjusting members 81, each including the straight flow path 82 having an optimum flow path area, are selected and assembled when the electric compressor 10 is assembled. The compressed air taken into the inside of the housing 11 is fed to a low-pressure stage side of the stator 31 through the low-pressure stage side air bearing 15 by the first air flow path 17, and cools the low-pressure stage side of the stator coil 33. In addition, the compressed air is fed to a high-pressure stage side of the stator 31 through the high-pressure stage side air bearing 16 by the second air flow path 18 branched from the first air flow path 17, and cools the high-pressure stage side of the stator coil 33.

Wear-resistant coatings are applied to inner surfaces of the low-pressure stage side air bearing 15 and the high-pressure stage side air bearing 16, and it is necessary to cool the inner surface temperatures of the low-pressure stage side air bearing 15 and the high-pressure stage side air bearing 16 to the heat resistance temperatures of the coatings or lower. The air flow rate adjusting device 19 adjusts the flow rate of the compressed air such that the inner surface temperatures of the low-pressure stage side air bearing 15 and the high-pressure stage side air bearing 16 are lower than or equal to the heat resistance temperatures.

In addition, since a current flows through the stator coil 33, the temperature of the stator 31 increases. The air flow rate adjusting device 19 adjusts the flow rate of the compressed air such that the temperature of the low-pressure stage side coil end 33a and the temperature of the high-pressure stage side coil end 33b in the stator coil 33 are within appropriate temperature ranges.

Specifically, the air flow rate adjusting device 19 adjusts the flow rate of the compressed air such that the inner surface temperature of the low-pressure stage side air bearing 15 and the inner surface temperature of the high-pressure stage side air bearing 16 are lower than or equal to the heat resistance temperatures, and such that the temperature of the low-pressure stage side coil end 33a and the temperature of the high-pressure stage side coil end 33b in the stator coil 33 are within the appropriate temperature ranges. In the electric compressor 10, the temperature of the high-pressure stage side bearing sleeve 37 or the temperature of the high-pressure stage side coil end 33b tends to be higher than the temperature of the low-pressure stage side bearing sleeve 36 or the low-pressure stage side coil end 33a. For this reason, the air flow rate adjusting device 19 adjusts the flow rate of the compressed air by selecting the air flow rate adjusting members 81 such that the amount of the compressed air flowing through the second air flow path 18 is larger than the amount of the compressed air flowing through the first air flow path 17. In this case, the flow rate of the compressed air is adjusted in consideration of the balance between the inner surface temperature of the low-pressure stage side air bearing 15 and the inner surface temperature of the high-pressure stage side air bearing 16 or the balance between the temperature of the low-pressure stage side coil end 33a and the temperature of the high-pressure stage side coil end 33b in the stator coil 33.

For this reason, the compressed air is supplied to the low-pressure stage side annular flow path 63a (low-pressure stage side space portion 63) through the first air flow path 17, and is supplied to the low-pressure stage side air bearing 15 through the other surface-side annular passage 63c. Here, the low-pressure stage side air bearing 15 and the low-pressure stage side bearing sleeve 36 are cooled by the compressed air.

Meanwhile, the compressed air branched from the first air flow path 17 is supplied to the high-pressure stage side annular flow path 73 through the axial air flow path 71 and the radial air flow path 72 of the second air flow path 18, and is supplied to the high-pressure stage side air bearing 16. Here, the high-pressure stage side air bearing 16 and the high-pressure stage side bearing sleeve 37 are cooled by the compressed air. Then, the compressed air flows into the gap between the stator 31 and the rotor 34, and cools the stator 31.

At this time, the flow rate of the compressed air flowing through the first air flow path 17 is also adjusted by adjusting the flow rate of the compressed air, which flows through the second air flow path 18, to be restricted using the air flow rate adjusting device 19. For this reason, the low-pressure stage side air bearing 15 and the low-pressure stage side bearing sleeve 36, and the high-pressure stage side air bearing 16 and the high-pressure stage side bearing sleeve 37 are cooled to appropriate temperatures. In addition, the high-pressure stage side coil end 33b and the low-pressure stage side coil end 33a of the stator coil 33 are cooled to appropriate temperatures.

Second Embodiment

Figure 6:
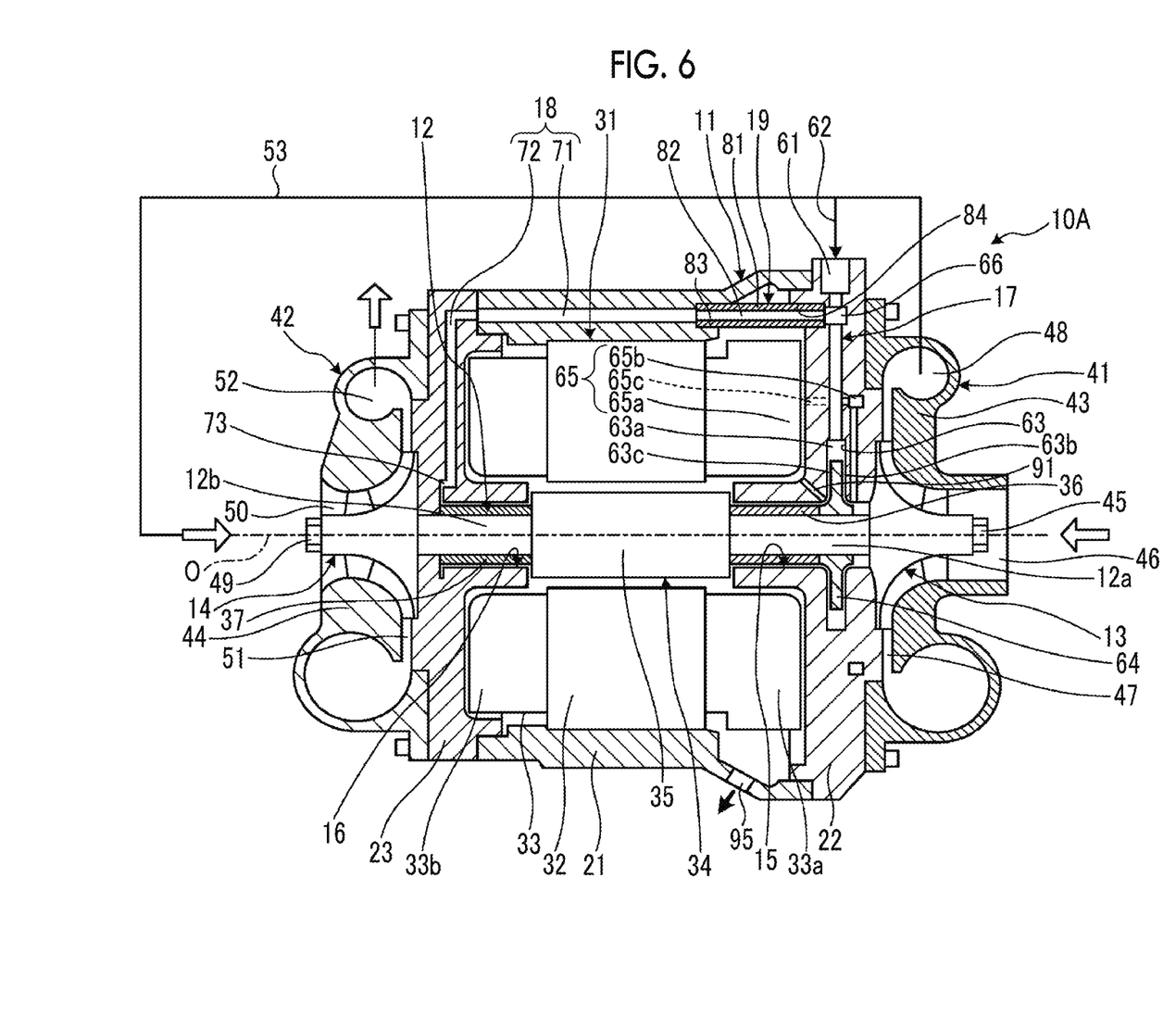
FIG. 6 is a longitudinal sectional view showing an internal configuration of an electric compressor according to a second embodiment.

FIG. 6 is a longitudinal sectional view showing an internal configuration of an electric compressor according to a second embodiment. Members having the same functions as those in the first embodiment described above are denoted by the same reference signs, and detailed descriptions thereof will be omitted.

As shown in FIG. 6, an electric compressor 10A includes the housing 11, the rotating shaft 12, the low-pressure stage wheel 13, the high-pressure stage wheel 14, the low-pressure stage side air bearing 15, the high-pressure stage side air bearing 16, the first air flow path 17, the second air flow path 18, and the air flow rate adjusting device 19, and the basic configuration is the same as that of the first embodiment.

The low-pressure stage side bearing housing 22 is provided with the first bypass flow path 65 and a second bypass flow path 91. The first bypass flow path 65 is open on the inner surface of the low-pressure stage side bearing housing 22 toward the stator coil 33 of the stator 31 through the one surface-side annular passage 63b. The second bypass flow path 91 is open on the inner surface of the low-pressure stage side bearing housing 22 toward the stator coil 33 of the stator 31 through the other surface-side annular passage 63c. In this case, the first bypass flow path 65 is open toward the coil end on a radially intermediate portion side of the stator coil 33, and the second bypass flow path 91 is open toward the coil end on a radially inner peripheral portion side of the stator coil 33. A plurality of the second bypass flow paths 91 are provided at intervals in the circumferential direction of the low-pressure stage side bearing housing 22.

For this reason, the compressed air in the low-pressure stage side annular flow path 63a is discharged from the one surface-side annular passage 63b toward the stator coil 33 through the first bypass flow path 65. In addition, the compressed air in the low-pressure stage side annular flow path 63a is supplied from the other surface-side annular passage 63c to the low-pressure stage gap between the low-pressure stage side air bearing 15 and the low-pressure stage side bearing sleeve 36, and is discharged toward the stator coil 33 through the second bypass flow path 91. Namely, with respect to the thrust disk 64, the compressed air in the one surface-side annular passage 63b is discharged toward the stator coil 33 by the first bypass flow path 65, and the compressed air in the other surface-side annular passage 63c is discharged toward the stator coil 33 by the second bypass flow path 91. In this case, the pressure in the one surface-side annular passage 63b and the pressure in the other surface-side annular passage 63c are equalized, so that the load on the one surface side and the load on the other surface side of the thrust disk 64 are balanced, and a thrust force acting on the rotating shaft 12 is reduced.

The compressed air in the other surface-side annular passage 63c is supplied to the low-pressure stage gap between the low-pressure stage side air bearing 15 and the low-pressure stage side bearing sleeve 36. For this reason, it is necessary to consider the number and the flow path area of the second bypass flow paths 91 such that the flow rate of the compressed air required by the low-pressure stage side air bearing 15 and the low-pressure stage side bearing sleeve 36 does not decrease.

Third Embodiment

Figure 7:
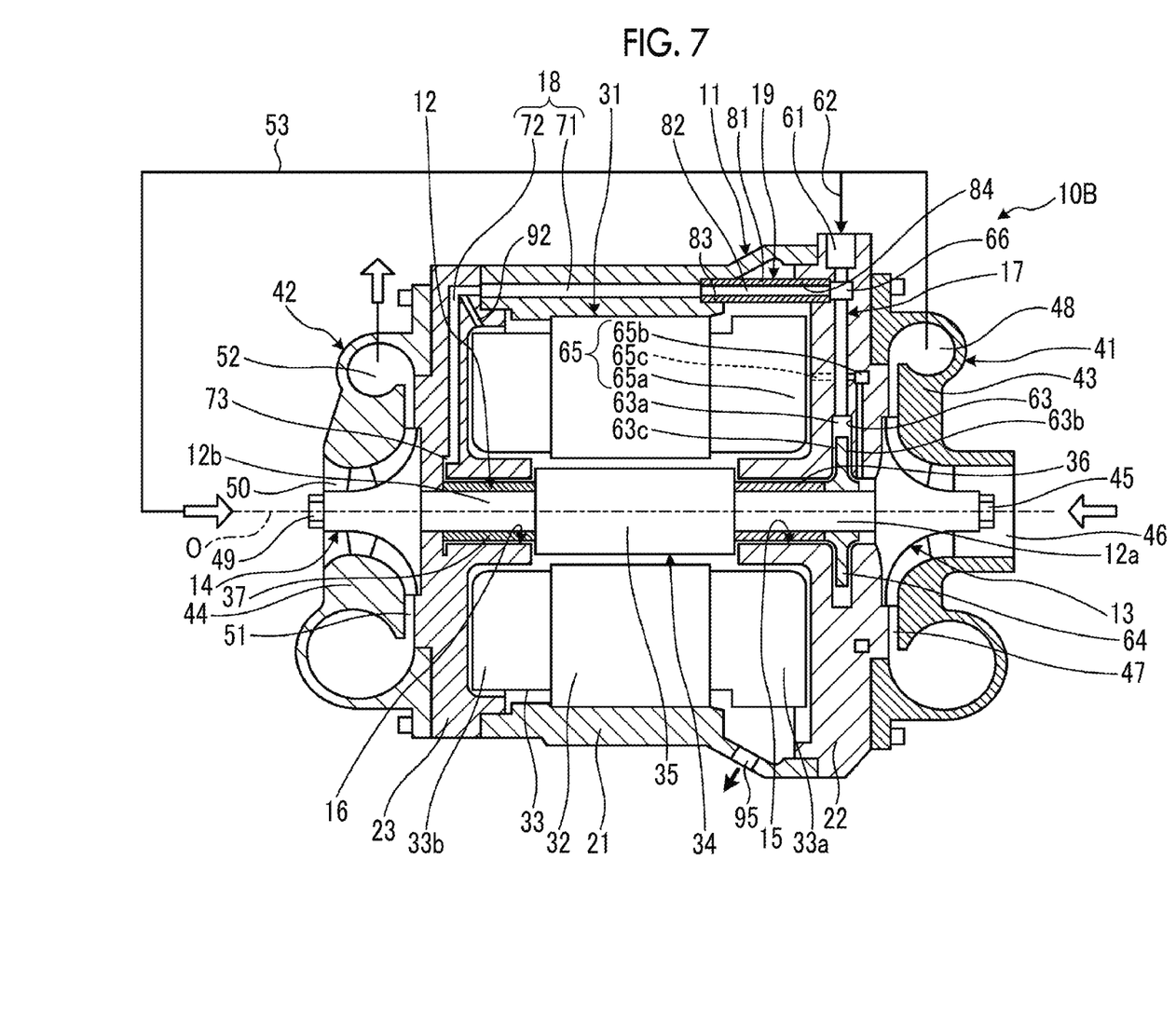
FIG. 7 is a longitudinal sectional view showing an internal configuration of an electric compressor according to a third embodiment.

FIG. 7 is a longitudinal sectional view showing an internal configuration of an electric compressor according to a third embodiment. Members having the same functions as those in the first embodiment described above are denoted by the same reference signs, and detailed descriptions thereof will be omitted.

As shown in FIG. 7, an electric compressor 10B includes the housing 11, the rotating shaft 12, the low-pressure stage wheel 13, the high-pressure stage wheel 14, the low-pressure stage side air bearing 15, the high-pressure stage side air bearing 16, the first air flow path 17, the second air flow path 18, and the air flow rate adjusting device 19, and the basic configuration is the same as that of the first embodiment.

The high-pressure stage side bearing housing 23 is provided with a third bypass flow path 92. The third bypass flow path 92 branches from the second air flow path 18, and is open toward the stator 31. One end of the third bypass flow path 92 communicates with a connecting portion between the axial air flow path 71 and the radial air flow path 72 of the second air flow path 18. The one end of the third bypass flow path 92 may be connected to at least one of the axial air flow path 71 and the radial air flow path 72. The other end of the third bypass flow path 92 is open on the inner surface of the high-pressure stage side bearing housing 23 toward the stator coil 33 of the stator 31. In this case, the third bypass flow path 92 is open toward the coil end on a radially outer peripheral portion side of the stator coil 33. A plurality of the third bypass flow paths 92 are provided at intervals in the circumferential direction of the high-pressure stage side bearing housing 23.

For this reason, the compressed air branched to the second air flow path 18 is supplied to the high-pressure stage side annular flow path 73 through the axial air flow path 71 and the radial air flow path 72, and is supplied to the high-pressure stage side air bearing 16. In addition, the compressed air branched to the second air flow path 18 is branched from the axial air flow path 71 to the third bypass flow paths 92, is discharged toward the high-pressure stage side coil end 33b of the stator coil 33 by the third bypass flow paths 92, and cools the high-pressure stage side coil end 33b.

In the electric compressor 10B, since the low-pressure air is compressed into the high-pressure air by the high-pressure stage compressor 42, the temperature of the high-pressure stage side coil end 33b of the stator coil 33 tends to increase. For this reason, the compressed air is guided to the high-pressure stage side coil end 33b of the stator coil 33 by the third bypass flow paths 92, so that the high-temperature coil end is actively cooled and an increase in temperature is suppressed.

In the electric compressor 10B, by providing the first bypass flow path 65 in the low-pressure stage side bearing housing 22, the compressed air is fed from the first bypass flow path 65 to the low-pressure stage side coil end 33a of the stator coil 33 to cool the low-pressure stage side coil end 33a. For this reason, the number and the flow path area of the third bypass flow paths 92 are set such that the temperature of the low-pressure stage side coil end 33a and the temperature of the high-pressure stage side coil end 33b of the stator coil 33 are appropriate temperatures.

Fourth Embodiment

Figure 8:
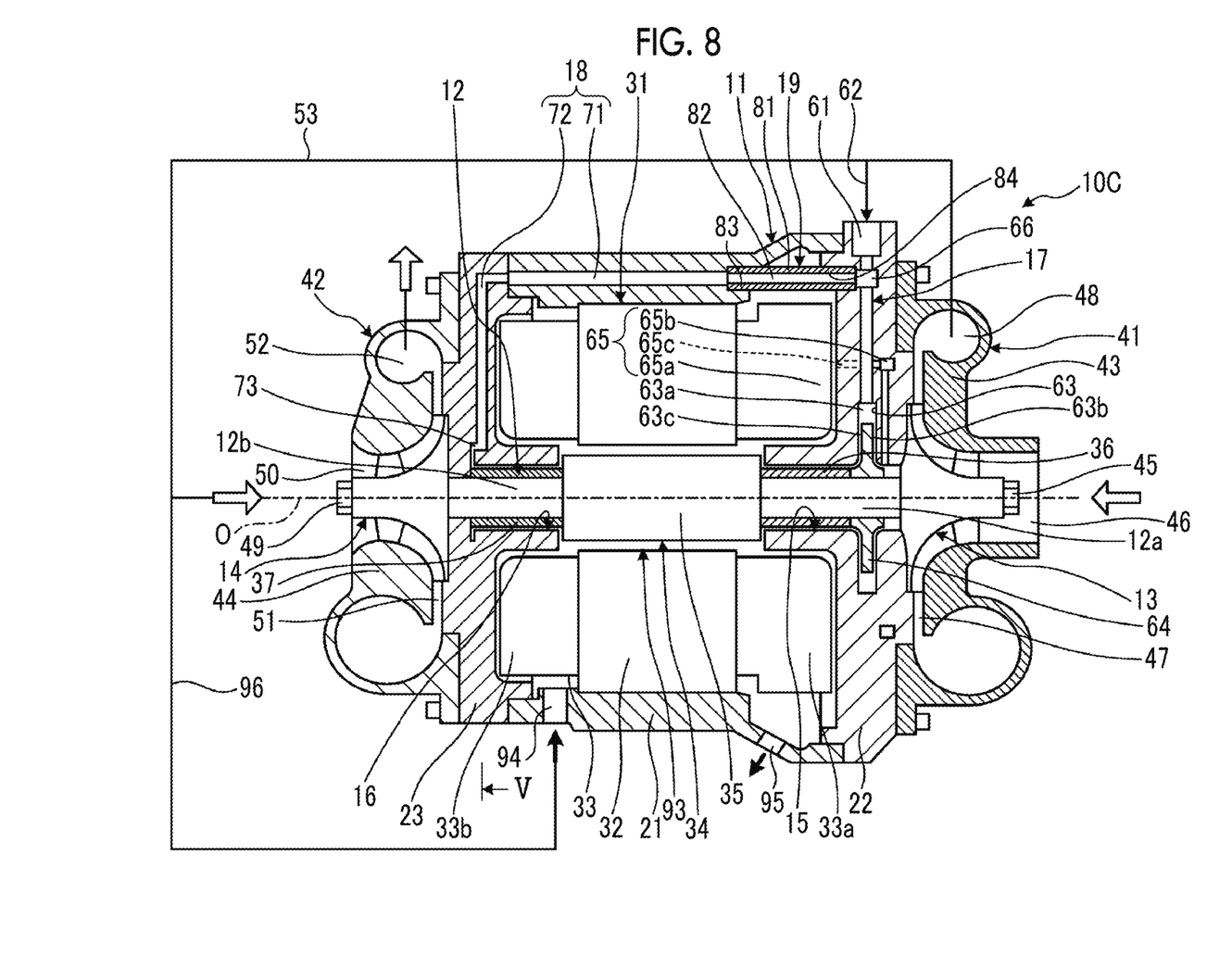
FIG. 8 is a longitudinal sectional view showing an internal configuration of an electric compressor according to a fourth embodiment.

FIG. 8 is a longitudinal sectional view showing an internal configuration of an electric compressor according to a fourth embodiment. Members having the same functions as those in the first embodiment described above are denoted by the same reference signs, and detailed descriptions thereof will be omitted.

As shown in FIG. 8, an electric compressor 10C includes the housing 11, the rotating shaft 12, the low-pressure stage wheel 13, the high-pressure stage wheel 14, the low-pressure stage side air bearing 15, the high-pressure stage side air bearing 16, the first air flow path 17, the second air flow path 18, and the air flow rate adjusting device 19, and the basic configuration is the same as that of the first embodiment.

The electric compressor 10C includes a third air flow path 93. The third air flow path 93 supplies the compressed air to the gap between the stator 31 and the rotor 34. The third air flow path 93 includes an air supply port 94 and an air discharge port 95. The air supply port 94 is provided on the high-pressure stage side bearing housing 23 side of the motor housing 21. The air discharge port 95 is provided on the low-pressure stage side bearing housing 22 side of the motor housing 21. The air supply port 94 is connected to an air bleeding flow path 96 branched from the connection flow path 53. The third air flow path 93 is a flow path through which the compressed air passes through the high-pressure stage side coil end 33b of the stator coil 33, a gap between the stator iron core 32 and the rotor 34, and the low-pressure stage side coil end 33a from the air supply port 94 and is discharged from the air discharge port 95. One third air flow path 93 (the air supply port 94 and the air discharge port 95) may be provided in the circumferential direction of the motor housing 21, or a plurality of the third air flow paths 93 may be provided at intervals in the circumferential direction.

For this reason, the compressed air taken into the inside of the housing 11 from the air intake port 61 is supplied to the low-pressure stage side air bearing 15 and the thrust disk 64 by the first air flow path 17, and is supplied to the high-pressure stage side air bearing 16 by the second air flow path 18, so that the low-pressure stage side air bearing 15 and the high-pressure stage side air bearing 16 are mainly cooled. Then, the compressed air taken into the inside of the housing 11 from the air supply port 94 is supplied to the stator 31 and the rotor 34, so that the stator 31 and the rotor 34 are mainly cooled. The compressed air that has cooled the low-pressure stage side air bearing 15 and the high-pressure stage side air bearing 16 and the compressed air that has cooled the stator 31 and the rotor 34 merge together and is discharged to the outside from the air discharge port 95. The compressed air that has flowed through the first air flow path 17 and the second air flow path 18 is also discharged from the air discharge port 95.

Actions and Effects of Present Embodiment

An electric compressor according to a first aspect includes a housing 11 including a stator 31 having a cylindrical shape; a rotating shaft 12 disposed inside the housing 11 and including a rotor 34 facing the stator 31; a low-pressure stage wheel 13 fixed to one axial side of the rotating shaft 12; a high-pressure stage wheel 14 fixed to the other axial side of the rotating shaft 12; a low-pressure stage side air bearing 15 that rotatably supports a low-pressure stage side shaft portion 12a of the rotating shaft 12 on the housing 11; a high-pressure stage side air bearing 16 that rotatably supports a high-pressure stage side shaft portion 12b of the rotating shaft 12 on the housing 11; a first air flow path 17 that supplies compressed air from the housing 11 to one of the low-pressure stage side air bearing 15 and the high-pressure stage side air bearing 16; a second air flow path 18 that branches from the first air flow path 17, and that supplies the compressed air to the other of the low-pressure stage side air bearing 15 and the high-pressure stage side air bearing 16; and an air flow rate adjusting device 19 that adjusts a flow rate of the compressed air flowing through the first air flow path 17 and the second air flow path 18.

According to the electric compressor according to the first aspect, the compressed air is supplied to the low-pressure stage side air bearing 15 by the first air flow path 17, and is supplied to the high-pressure stage side air bearing 16 by the second air flow path 18 branched from the first air flow path 17. For this reason, the structure can be simplified by eliminating the need for providing an annular flow path, which temporarily stores the compressed air, in the housing 11, and the low-pressure stage side air bearing 15 and the high-pressure stage side air bearing 16 are allowed to properly function by reducing the pressure loss of the compressed air. In addition, the flow rate of the compressed air flowing through the first air flow path 17 and the second air flow path 18 is adjusted by the air flow rate adjusting device 19. For this reason, an appropriate amount of the compressed air can be supplied to the low-pressure stage side air bearing 15 and the high-pressure stage side air bearing 16, the low-pressure stage side air bearing 15 and the high-pressure stage side air bearing 16 are allowed to properly function, and the low-pressure stage side air bearing 15 and the high-pressure stage side air bearing 16 can be properly cooled.

In the electric compressor according to a second aspect, only one first air flow path 17 and only one second air flow path 18 are provided in the housing 11. Accordingly, the low-pressure stage side air bearing 15 and the high-pressure stage side air bearing 16 are allowed to properly function by reducing the pressure loss of the compressed air.

In the electric compressor according to a third aspect, the first air flow path 17 is provided along a radial direction of the rotating shaft 12 in the housing 11, and the second air flow path 18 is provided with an axial air flow path 71 branching from the first air flow path 17 and provided along an axial direction of the rotating shaft 12 in the housing 11, and a radial air flow path 72 communicating with the axial air flow path 71 and provided along the radial direction of the rotating shaft 12 in the housing 11. Accordingly, the second air flow path 18 can be simplified, and the compressed air can be properly supplied to the high-pressure stage side air bearing 16 by reducing the pressure loss of the compressed air.

In the electric compressor according to a fourth aspect, the air flow rate adjusting device 19 is provided in at least one of the first air flow path 17 and the second air flow path 18. Accordingly, by adjusting the flow rate of one of the first air flow path 17 and the second air flow path 18 using the air flow rate adjusting device 19, the flow rate of the other can also be adjusted, and the structure can be simplified.

In the electric compressor according to a fifth aspect, the air flow rate adjusting device 19 is provided with an air flow rate adjusting member 81 having a predetermined flow path area set in advance, and the air flow rate adjusting member 81 is detachably provided in the housing 11. Accordingly, the flow rate of the first air flow path 17 and the second air flow path 18 can be appropriately adjusted by mounting the air flow rate adjusting member 81 having an optimum flow path area in the housing 11 according to the form of the electric compressor 10, 10A, 10B, or 10C.

The electric compressor according to a sixth aspect further includes a thrust disk 64 fixed to a low-pressure stage wheel 13 side or a high-pressure stage wheel 14 side of the rotating shaft 12; a first bypass flow path 65 that branches from the first air flow path 17, and that is open toward the stator 31 through one surface side of the thrust disk 64; and a second bypass flow path 91 that branches from the first air flow path 17, and that is open toward the stator 31 through the other surface side of the thrust disk 64. Accordingly, the pressure on the one surface side and the pressure on the other surface side with respect to the thrust disk 64 are equalized, so that the load on the one surface side and the load on the other surface side of the thrust disk 64 are balanced, and the thrust force acting on the rotating shaft 12 is reduced.

In the electric compressor according to a seventh aspect, the second air flow path 18 supplies the compressed air to the high-pressure stage side air bearing 16, and is provided with a third bypass flow path 92 that branches from the second air flow path 18 and that is open toward the stator 31. Accordingly, the compressed air is actively supplied from the second air flow path 18 to the high-pressure stage side coil end 33b of the stator coil 33, so that the high-pressure stage side coil end 33b that is relatively likely to become hot can be properly cooled.

The electric compressor according to an eighth aspect further includes a third air flow path 93 that supplies the compressed air from the housing 11 to a gap between the stator 31 and the rotor 34, separately from the first air flow path 17 and the second air flow path 18. Accordingly, the first air flow path 17 and the second air flow path 18 supply the compressed air to the low-pressure stage side air bearing 15 and the high-pressure stage side air bearing 16 to cool the low-pressure stage side air bearing 15 and the high-pressure stage side air bearing 16. Meanwhile, the third air flow path 93 supplies the compressed air to the stator 31 and the rotor 34 to cool the stator 31 and the rotor 34. For this reason, cooling performance can be improved by cooling the low-pressure stage side air bearing 15 and the high-pressure stage side air bearing 16, and the stator 31 and the rotor 34 using dedicated compressed air.

In the above-described embodiments, the first air flow path 17 is provided in the low-pressure stage side bearing housing 22, and the second air flow path 18 is provided in the motor housing 21 and the high-pressure stage side bearing housing 23; however, the present disclosure is not limited to this configuration. The first air flow path 17 may be provided in the high-pressure stage side bearing housing 23, and the second air flow path 18 may be provided in the motor housing 21 and the low-pressure stage side bearing housing 22.

REFERENCE SIGNS LIST 10, 10A, 10B, 10C: Electric compressor
11: Housing
12: Rotating shaft
12a: Low-pressure stage side shaft portion
12b: High-pressure stage side shaft portion
13: Low-pressure stage wheel
14: High-pressure stage wheel
15: Low-pressure stage side air bearing
16: High-pressure stage side air bearing
17: First air flow path
18: Second air flow path
19: Air flow rate adjusting device
21: Motor housing
22: Low-pressure stage side bearing housing
23: High-pressure stage side bearing housing
31: Stator
32: Stator iron core
33: Stator coil
33a: Low-pressure stage side coil end
33b: High-pressure stage side coil end
34: Rotor
35: Rotor iron core
36: Low-pressure stage side bearing sleeve
37: High-pressure stage side bearing sleeve
41: Low-pressure stage compressor
42: High-pressure stage compressor
43: Low-pressure stage side housing
44: High-pressure stage side housing
45, 49: Bolt
46, 50; Suction port
47, 51: Diffuser
48, 52: Scroll portion
53: Connection flow path
61: Air intake port
62: Air bleeding flow path
63: Low-pressure stage side space portion
63a: Low-pressure stage side annular flow path
63b: One surface-side annular passage
63c: Other surface-side annular passage
64; Thrust disk
65; First bypass flow path
65a: Radial flow path 65b: Annular flow path
65c: Axial flow path
66: Branching portion
71: Axial air flow path
72: Radial air flow path
73: High-pressure stage side annular flow path
81: Air flow rate adjusting member
82: Straight flow path
83: First accommodation recessed portion
84: Second accommodation recessed portion
91: Second bypass flow path
92: Third bypass flow path
93: Third air flow path
94: Air supply port
95: Air discharge port
96; Air bleeding flow path

The invention claimed is:

1. An electric compressor comprising:
a housing including a stator having a cylindrical shape;
a rotating shaft disposed inside the housing and including a rotor facing the stator;
a low-pressure stage wheel fixed to one axial side of the rotating shaft;
a high-pressure stage wheel fixed to the other axial side of the rotating shaft;
a low-pressure stage side air bearing that rotatably supports a low-pressure stage side shaft portion of the rotating shaft on the housing;
a high-pressure stage side air bearing that rotatably supports a high-pressure stage side shaft portion of the rotating shaft on the housing;
a first air flow path that supplies compressed air from the housing to one of the low-pressure stage side air bearing and the high-pressure stage side air bearing;
a second air flow path that branches from the first air flow path, and that supplies the compressed air to the other of the low-pressure stage side air bearing and the high-pressure stage side air bearing; and
an air flow rate adjusting device that adjusts a flow rate of the compressed air flowing through the first air flow path and the second air flow path,
wherein the first air flow path is provided along a radial direction of the rotating shaft in the housing, and the second air flow path includes an axial air flow path branching from the first air flow path and provided along an axial direction of the rotating shaft in the housing, and a radial air flow path communicating with the axial air flow path and provided along the radial direction of the rotating shaft in the housing,
wherein the air flow rate adjusting device
is provided in the axial air flow path,
includes an air flow rate adjusting member having a predetermined flow path area set in advance so that the compressed air flowing in the second air channel is more than the compressed air flowing in the first air channel, and the air flow rate adjusting member is detachably provided in the housing.

2. The electric compressor according to claim 1,
wherein only one first air flow path and only one second air flow path are provided in the housing.

3. The electric compressor according to claim 1, further comprising:
a thrust disk fixed to a low-pressure stage wheel side or a high-pressure stage wheel side of the rotating shaft;
a first bypass flow path that branches from the first air flow path, and that is open toward the stator through one surface side of the thrust disk; and
a second bypass flow path that branches from the first air flow path, and that is open toward the stator through the other surface side of the thrust disk.

4. The electric compressor according to claim 1,
wherein the second air flow path supplies the compressed air to the high-pressure stage side air bearing, and includes a third bypass flow path that branches from the second air flow path and that is open toward the stator.

5. The electric compressor according to claim 1, further comprising:
a third air flow path that supplies the compressed air from the housing to a gap between the stator and the rotor, separately from the first air flow path and the second air flow path.

6. The electric compressor according to claim 2,
wherein the first air flow path is provided along a radial direction of the rotating shaft in the housing, and the second air flow path includes an axial air flow path branching from the first air flow path and provided along an axial direction of the rotating shaft in the housing, and a radial air flow path communicating with the axial air flow path and provided along the radial direction of the rotating shaft in the housing.

7. The electric compressor according to claim 2,
wherein the air flow rate adjusting device is provided in at least one of the first air flow path and the second air flow path.

8. The electric compressor according to claim 1,
wherein the air flow rate adjusting device is provided in at least one of the first air flow path and the second air flow path.

9. The electric compressor according to claim 2,
wherein the air flow rate adjusting device includes an air flow rate adjusting member having a predetermined flow path area set in advance, and the air flow rate adjusting member is detachably provided in the housing.

10. The electric compressor according to claim 1
wherein the air flow rate adjusting device includes an air flow rate adjusting member having a predetermined flow path area set in advance, and the air flow rate adjusting member is detachably provided in the housing.

11. The electric compressor according to claim 1,
wherein the air flow rate adjusting device includes an air flow rate adjusting member having a predetermined flow path area set in advance, and the air flow rate adjusting member is detachably provided in the housing.

12. The electric compressor according to claim 2, further comprising:
a thrust disk fixed to a low-pressure stage wheel side or a high-pressure stage wheel side of the rotating shaft;
a first bypass flow path that branches from the first air flow path, and that is open toward the stator through one surface side of the thrust disk; and
a second bypass flow path that branches from the first air flow path, and that is open toward the stator through the other surface side of the thrust disk.

13. The electric compressor according to claim 1, further comprising:
a thrust disk fixed to a low-pressure stage wheel side or a high-pressure stage wheel side of the rotating shaft;
a first bypass flow path that branches from the first air flow path, and that is open toward the stator through one surface side of the thrust disk; and a second bypass flow path that branches from the first air flow path, and that is open toward the stator through the other surface side of the thrust disk.

14. The electric compressor according to claim 1, further comprising:
- a thrust disk fixed to a low-pressure stage wheel side or a high-pressure stage wheel side of the rotating shaft;
- a first bypass flow path that branches from the first air flow path, and that is open toward the stator through one surface side of the thrust disk; and
- a second bypass flow path that branches from the first air flow path, and that is open toward the stator through the other surface side of the thrust disk.

* * * * *